(12) United States Patent
Toth

(10) Patent No.: US 10,087,011 B2
(45) Date of Patent: Oct. 2, 2018

(54) CHAIN RAIL LOADING SYSTEM

(71) Applicant: Keith Manufacturing Co., Madras, OR (US)

(72) Inventor: Tim Toth, Madras, OR (US)

(73) Assignee: Keith Manufacturing Co., Madras, OR (US)

( * ) Notice: Subject to any disclaimer, the term of this patent is extended or adjusted under 35 U.S.C. 154(b) by 0 days.

(21) Appl. No.: 14/586,553

(22) Filed: Dec. 30, 2014

(65) Prior Publication Data

US 2015/0183587 A1    Jul. 2, 2015

Related U.S. Application Data

(60) Provisional application No. 61/922,735, filed on Dec. 31, 2013.

(51) Int. Cl.
| | | |
|---|---|---|
| *B65G 21/20* | (2006.01) | |
| *B65G 37/00* | (2006.01) | |
| *B65G 23/44* | (2006.01) | |
| *B65G 15/62* | (2006.01) | |
| *B65G 15/14* | (2006.01) | |
| *B65G 15/64* | (2006.01) | |
| *B65G 21/22* | (2006.01) | |

(52) U.S. Cl.
CPC ............ *B65G 21/20* (2013.01); *B65G 15/14* (2013.01); *B65G 15/62* (2013.01); *B65G 15/64* (2013.01); *B65G 21/22* (2013.01); *B65G 23/44* (2013.01); *B65G 37/005* (2013.01)

(58) Field of Classification Search
CPC ...... B65G 15/14; B65G 37/005; B65G 23/44; B65G 23/06; B65G 21/20; B65G 15/62; B65G 15/64
USPC .... 198/604, 605, 813, 816, 834, 837, 836.1, 198/841
See application file for complete search history.

(56) References Cited

U.S. PATENT DOCUMENTS

| | | | |
|---|---|---|---|
| 4,051,969 A * | 10/1977 | Homanick | |
| 4,164,283 A * | 8/1979 | Flajnik | 198/840 |
| 4,358,010 A * | 11/1982 | Besch | 198/838 |
| 4,556,143 A * | 12/1985 | Johnson | 198/841 |
| 5,186,314 A * | 2/1993 | Clopton | 198/860.2 |
| 5,190,145 A * | 3/1993 | Ledginham et al. | 198/841 |
| 5,259,495 A * | 11/1993 | Douglas | H05K 13/0061 198/404 |
| 6,200,036 B1 * | 3/2001 | Girardey | 384/260 |
| 6,769,534 B2 * | 8/2004 | Lee | H05K 13/0061 198/817 |
| 6,988,612 B1 * | 1/2006 | Kabeshita | H05K 13/0061 198/369.1 |
| 7,090,070 B2 * | 8/2006 | Linder | 198/841 |
| 7,942,398 B1 * | 5/2011 | Marcinik | 270/58.01 |
| 8,944,240 B2 * | 2/2015 | Frederick | 198/611 |
| 2008/0298940 A1 * | 12/2008 | Cleasby et al. | |

* cited by examiner

*Primary Examiner* — Leslie A Nicholson, III
(74) *Attorney, Agent, or Firm* — Wells St. John P.S.

(57) ABSTRACT

The load conveyer system includes a pair of rails that carry endless chains. Each rail has its own dedicated drive motor that operates independently of the other. The motors are sized to fit within the vertical height or vertical envelope of the rail, so that the motor does not interfere with movement of the load carried by the rail. Each rail and drive motor are independently mountable to an underlying support surface as a module.

6 Claims, 4 Drawing Sheets

CHAIN RAIL LOADING SYSTEM

TECHNICAL FIELD

The present disclosure relates to a chain rail loading system, and more specifically, to a chain rail loading system that is adapted to be installed in a trailer or shipping container.

BACKGROUND OF THE INVENTION

Different kinds of conveyer systems have been designed or built for unloading trailers, depending on the type of load carried by the trailer. Reciprocating floor slat conveyers are one type of unloading system that is installed as part of a trailer floor for the purpose of unloading various kinds bulk materials carried by the trailer. These systems are used to "inch" the load off the back end of the trailer and can be built into the floor of a trailer. The unloading process requires a certain period of time.

Trailers are also used to haul palletized loads. While a reciprocating floor slat system can unload palletized loads, it offers a slow rate of unloading speed for the user, relatively speaking. The present disclosure provides a different type of unloading system that can be built into or onto the floor of a trailer; it offers a high rate of loading/unloading speed; and it is also constructed from light materials, so that the gross hauling weight of the trailer can be maximized.

This disclosure claims priority on Provisional Appl. No. 61/922,735.

SUMMARY OF THE INVENTION

The present disclosure is a load conveyer system. The load conveyer system includes a pair of elongated rails. Each rail is independently mountable to an underlying support or underlying support surface, typically, the framework of a trailer bed.

The rails are mountable so that they are substantially parallel to each other, for the purpose of creating a load-carrying track. Each rail has a certain height, although both rails have substantially the same height. The height of the rails creates a vertical space or envelope above the underlying support for the rails.

Each rail carries an endless chain, thus creating a pair of endless chains for conveying a load (i.e., a palletized load or the like). Each rail also has opposite ends that carry a rotatable end sprocket (where the direction of the chain is reversed). Each rail is made so that it defines an upper guide way that is adapted to enable the endless chain (carried by the rail) to move along a top side of the rail, in an exposed manner. This provides a load supporting surface for the chain to convey the load in one direction or the other. Each rail also has a lower passageway, for returning the endless chain in an opposite direction.

Next, each rail carries at least one drive sprocket for driving the endless chain. While the drive sprocket may be the same as one of the rotatable end sprockets, it is possible that the drive sprocket could be yet another sprocket, also carried by the rail.

The drive sprocket is operatively connected to a motor that is dedicated to driving only that drive sprocket. In other words, the motor only drives one endless chain carried by one rail. A separate motor drives the endless chain carried by each rail, independently, thus creating a conveyer system that has separate motors dedicated to each rail of the pair. Since each motor operates independently of the other, there is no mechanical drive connections between rails. This also enables each rail to be independently mounted on a trailer floor or the like. Moreover, the user may select the number of rails, depending on the purpose of the load conveyer system. While two rails may be preferred, the user may select a different number.

Finally, the drive motors are sized so that they fit within the envelope defined by the vertical height of the rails. In this manner, the height of the motor does not interfere with movement of the load that is carried by the rails. It also makes for easier kit installation of a chain rail/motor module on an existing trailer floor.

The foregoing and other features will be better understood upon review of the drawings and description that follows.

BRIEF DESCRIPTION OF THE DRAWINGS

In the drawings, like reference numerals and letters refer to like parts throughout the various views, and wherein.

DETAILED DESCRIPTION

Figure 1:
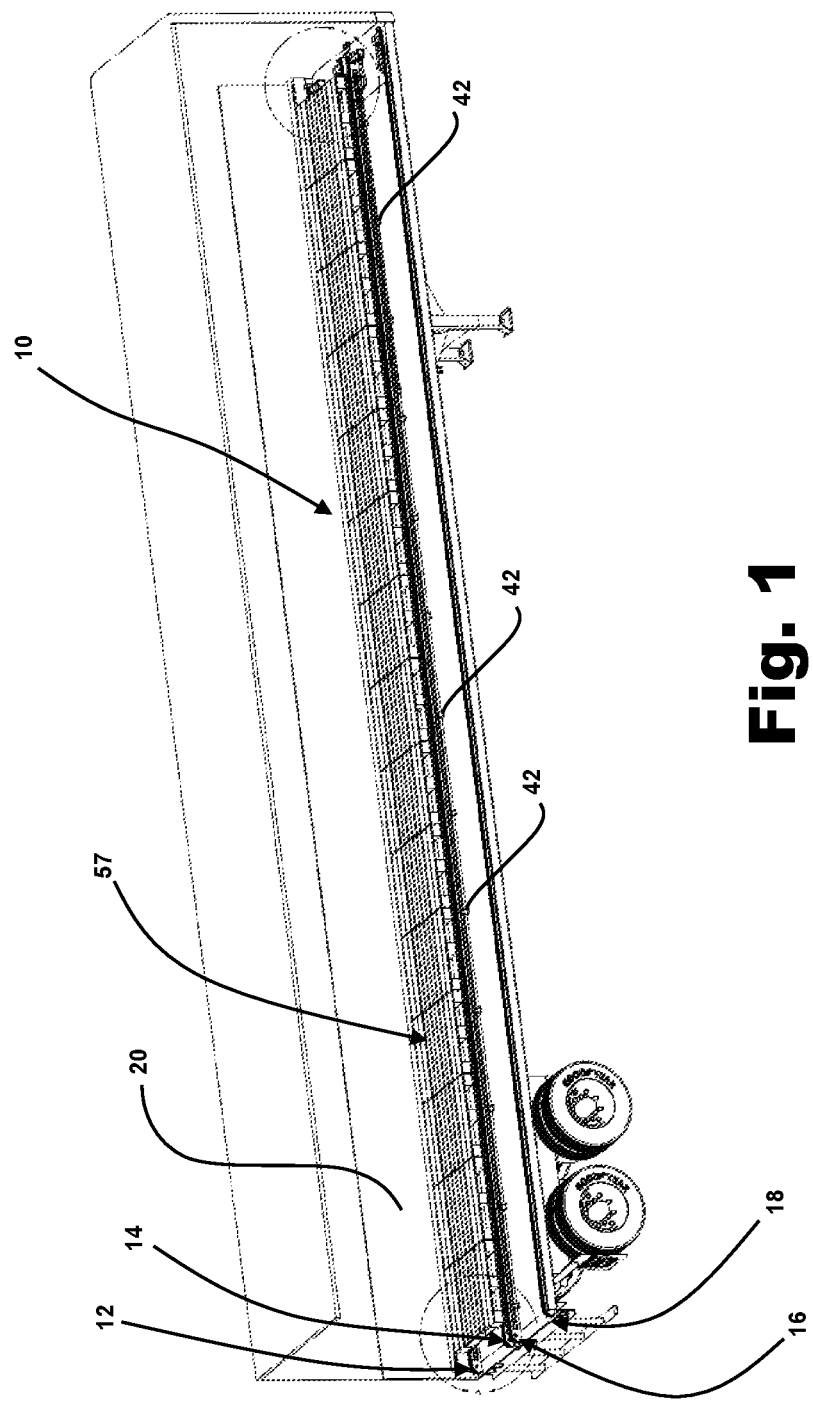
FIG. 1 is a pictorial view of a trailer with the modular chain rail loading system installed therein.

Referring now to the drawings, and first to FIG. 1, shown generally at 10 is a chain rail loading system in accordance with the present disclosure. The chain rail system 10 is a modular system, as will be further described below.

Figure 2:
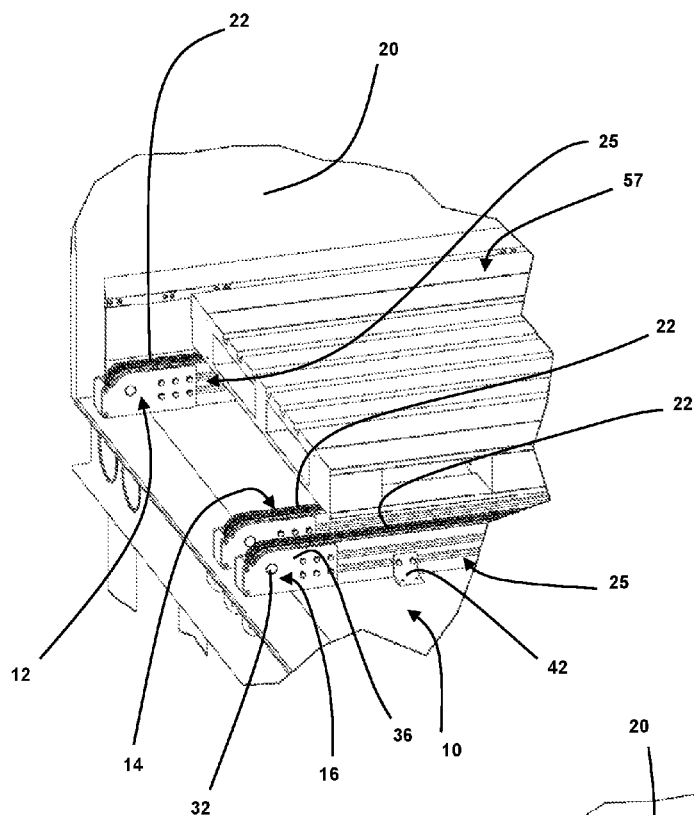
FIG. 2 is a pictorial view of the aft end (relative to the trailer) of the chain rail loading system.

Referring to FIG. 2, the chain rail system 10 includes a plurality of individual chain rails 12, 14, 16, 18. Referring back to FIG. 1, in preferred form, the system is designed to load or unload two parallel rows of pallets. Therefore, there is one chain rail 12, 18, adjacent each container sidewall (for example, one container sidewall is illustrated at 20 in FIG. 1). There are two side-by-side chain rails 14, 16 on the interior, running generally along the center line of the trailer floor. Chain rails 12,14 operate as one pair; chain rails 16, 18 operate as a second pair.

Figure 9:
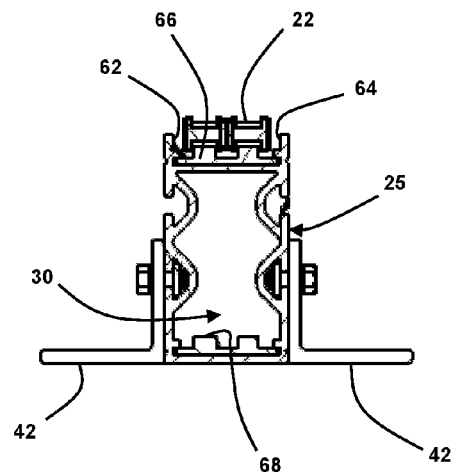
FIG. 9 is a view similar to FIG. 8, but shows placement of the chain around the chain rail and a mounting bracket for mounting the chain rail to the floor of a trailer.

Each chain rail consists of an endless chain 22 (illustrated as a double-chain) that runs along the top 24 of each chain rail (see FIG. 9). In FIG. 9, the single chain rail unit is generally indicated at 25. Sprockets 26, 28 at each end of the chain rail allow the endless chain 22 to reverse direction from the chain rail top surface 24, to run in the opposite direction (inside the lower region of the rail) during the chain's return. Referring to FIG. 9, the lower return region is generally indicated by reference numeral 30.

The sprockets are fairly conventional in that they are mounted via a spindle 32 to side brackets 34, 36. A series of bolts or similar fasteners, indicated generally at 38, connect the brackets 34, 36 and allow for a certain amount of chain tension adjustment, as desired.

Figure 7:
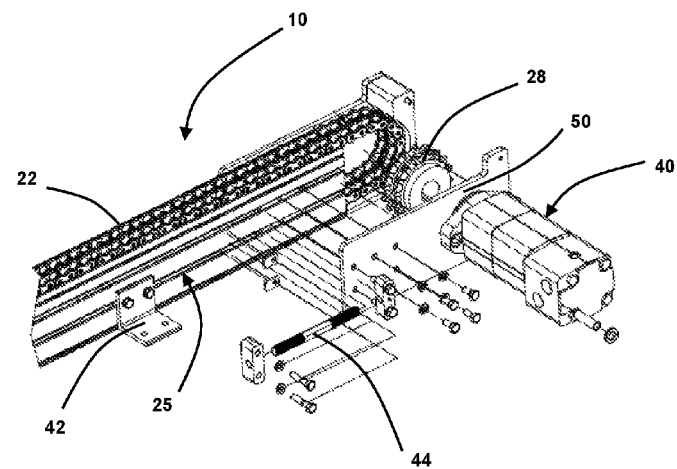
FIG. 7 is an exploded view of the forward end illustrated in FIG. 6.

On the forward end (e.g., see FIG. 7), the sprocket 28 is driven by a motor 40. Each individual chain rail will have its own motor 40. In preferred form, the motor 40 is a direct drive, hydraulic motor.

Each chain rail is mounted to the floor of the trailer via a series of brackets 42. Like the aft end of the rail, the forward end has side plates 48, 50 that may be adjusted for the purpose of addressing chain tension. A tension adjustment bolt 44 is provided for this purpose.

Figure 10:
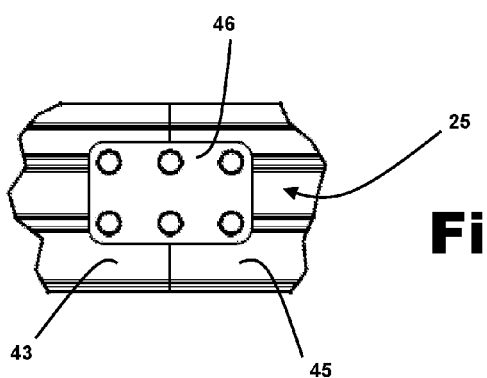
FIG. 10 is a side view showing a modular connection between different segments of the chain rail.
Figure 11:
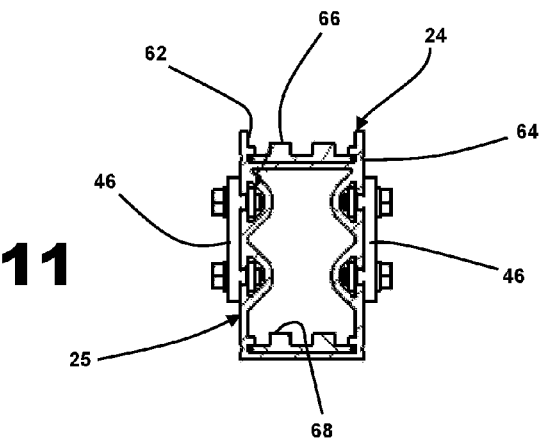
FIG. 11 is a cross sectional view of FIG. 10.

Each chain rail in the system is designed to be built in segments 43, 45 that are butted together and joined by a fastener bracket 46 (see FIG. 10). In this way, the overall length of the chain rail system may be adjusted to adapt to different container lengths.

Figure 3:
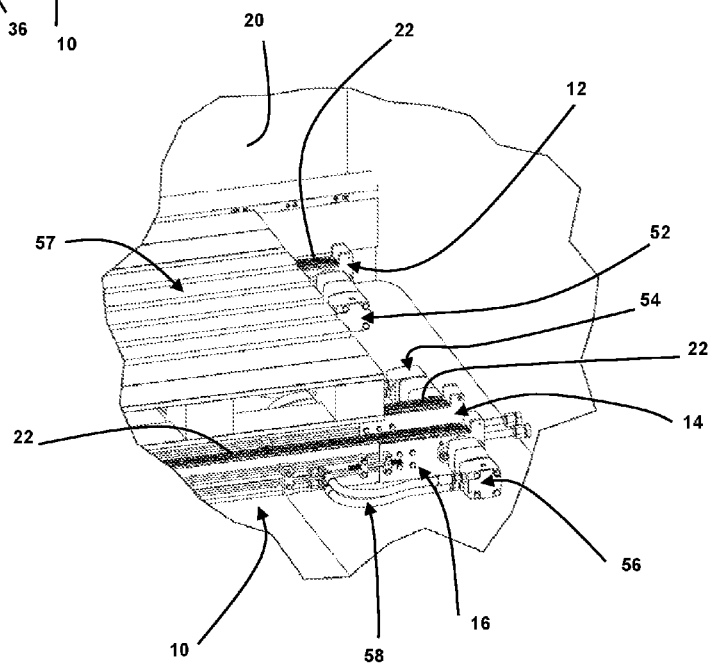
FIG. 3 is a pictorial view of the forward end (relative to the trailer) of the chain rail loading system.
Figure 4:
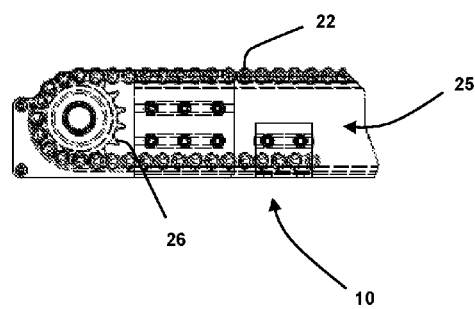
FIG. 4 is a side view of the aft end of one chain rail.
Figure 5:
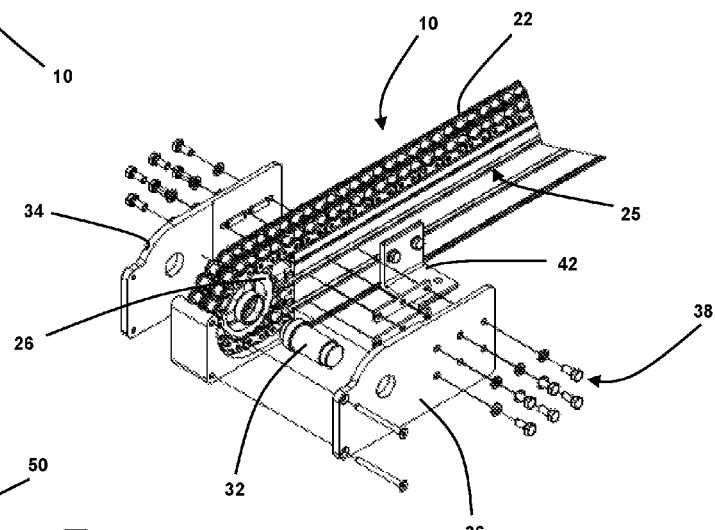
FIG. 5 is an exploded view of the chain rail illustrated in FIG. 4.
Figure 6:
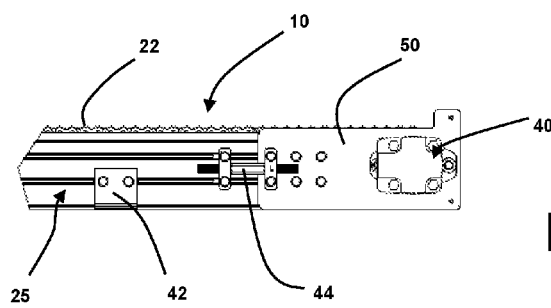
FIG. 6 is a side view of the forward end of one chain rail.

As described above, each chain rail 12, 14, 16, 18 has its own drive motor (see, e.g., items 52, 54, 56 in FIG. 3). These motors are driven by hydraulic hoses 58 and may be reversed, as needed, for the purpose of driving the chain rail systems in a clockwise or counterclockwise direction. Obviously, during a loading operation, the motors 52, 54, 56 are driven simultaneously so that the respective chains on the system move clockwise until the loading procedure is completed. Unloading involves reversing the direction of the motors.

Figure 8:
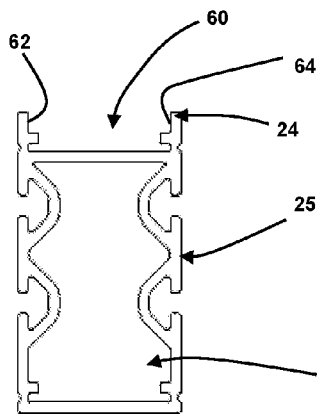
FIG. 8 is a cross sectional view of a chain rail.

The hydraulic motors 52, 54, 56 sit within the height of the chain rails 12, 14, 16, 18 so as to not interfere with pallet loading/unloading. Typical pallets are indicated at 57 in FIGS. 1, 2 and 3. Each chain rides on an extruded alley or guide way 60 (see FIG. 8), on top of the chain rail, thus eliminating idler pulleys for the chain. The chain 22 is retained in between sidewalls 62, 64 of the alley way 60. Replaceable plastic wear strips 66, 68 are placed on the rail 25, as indicated, to guide the chain 22.

The scope of the patent right is not intended to be limited to the foregoing description. Instead, the patent right is limited to the patent claim or patent claims that follow, the interpretation of which is to be made in accordance with the standard doctrines of patent claim interpretation.

What is claimed is:

1. A load conveyor system, comprising:
   at least a pair of elongated rails, each rail of said pair being independently mountable to an underlying support relative to the other rail; and with
   said rails being independently mountable in a substantially parallel arrangement to create a load-carrying track; and wherein
   each one of said pair of rails has a certain height; and further,
   each rail being adapted to carry an endless chain, with each rail having opposite ends that carry a rotatable end sprocket, and with each rail having an upper guide way adapted to enable said endless chain to move along a top side of said rail in an exposed manner, for conveying a load in one length-wise direction, and with each rail further having a lower passageway positioned above the underlying support for returning the endless chain in an opposite length-wise direction; and still further,
   each rail carrying at least one drive sprocket positioned above the underlying support for driving said endless chain, said at least one drive sprocket being operatively connected to a motor dedicated to driving said at least one drive sprocket, and therefore, driving said endless chain carried by said rail; and still further
   at least one motor for driving said endless chains carried by said rails, said motor being positioned laterally adjacent to at least one of said rails such that the motor is positioned at least partly below the path of a load carried by said pair of rails, said motor being sized so that the height of the motor allows the motor to fit above the underlying support surface but with the height of the motor being sufficiently low enough to not interfere with the load carried by said endless chains, so that the load can pass over the motor.

2. The load conveyer system of claim 1, wherein one of said end sprockets comprises said drive sprocket.

3. The load conveyer system of claim 1, wherein said motor is a hydraulic motor.

4. The load conveyer system of claim 1, including chain tightening adjustment means for adjusting the slackness of said endless chain carried by said rail, said chain adjustment means carrying said drive sprocket and said motor.

5. The load conveyor system of claim 1, wherein said upper guide way and said lower passageway of each rail carry a plastic wear strip, for guiding said endless chain.

6. The load conveyor system of claim 1, wherein each rail comprises a plurality of chain rail segments joined together to define a desired load-carrying length for each rail.

* * * * *